Sept. 29, 1925.

E. R. BURTNETT

INTERNAL COMBUSTION ENGINE

Filed Oct. 23, 1924

1,555,810

INVENTOR,
Everett R. Burtnett.
By Martin P. Smith, Atty.

Patented Sept. 29, 1925.

1,555,810

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed October 23, 1924. Serial No. 745,342.

*To all whom it may concern:*

Be it known that I, EVERETT R. BURTNETT, a citizen of the United States, residing at Los Angeles, in the county of Los Angeles and State of California, have invented certain new and useful Improvements in Internal-Combustion Engines, of which the following is a specification.

My invention relates to internal combustion engines of the particular type disclosed in United States Letters Patent No. 1,483,331 issued to me and my assignee, Charles A. Burtnett, February 12, 1924, the principal object of my invention being to provide in the head for the combustion chambers of the engine shown and described in the patent aforesaid a turbulence chamber in which the gaseous fuel that is admitted to the combustion chambers is, during the contortion stroke of the pistons within said combustion chambers, very thoroughly agitated and mixed with a certain amount of residual products of combustion that remain in the combustion chambers from the previously ignited charge.

A further object of my invention is to form and arrange the turbulence chamber so as to produce the greatest possible degree of agitation or turbulence of the gaseous fuel charge that is compressed within said turbulence chamber, thus materially increasing engine efficiency in operation and effecting a more thorough and complete combustion of the ignited fuel charge.

With the foregoing and other objects in view, my invention consists in the novel features of construction and arrangement of elements which will be hereinafter described and claimed, reference being had to the accompanying drawings, in which—

Figure 1:
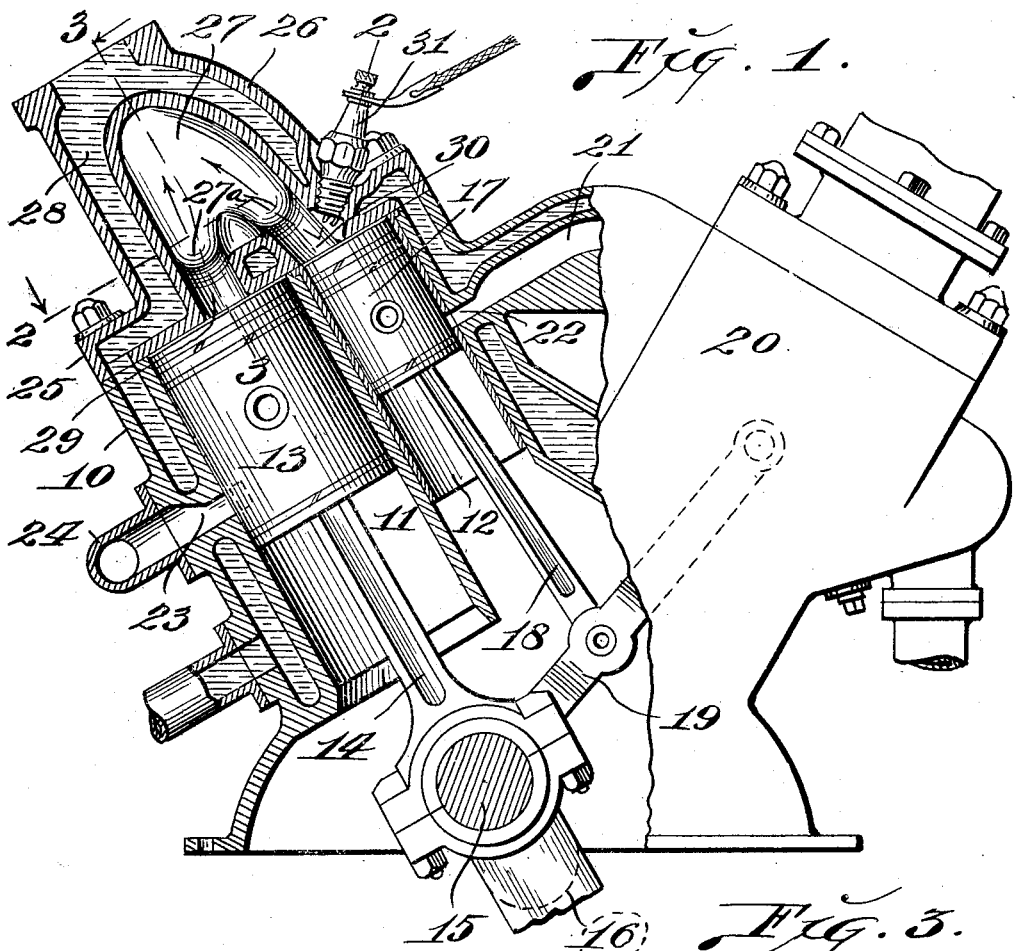
Figure 1 is an end elevational view of an engine, with the combustion cylinders in vertical section and showing a turbulence head of my improved construction in position upon the head ends of the combustion chambers.
Figures 2, 3:
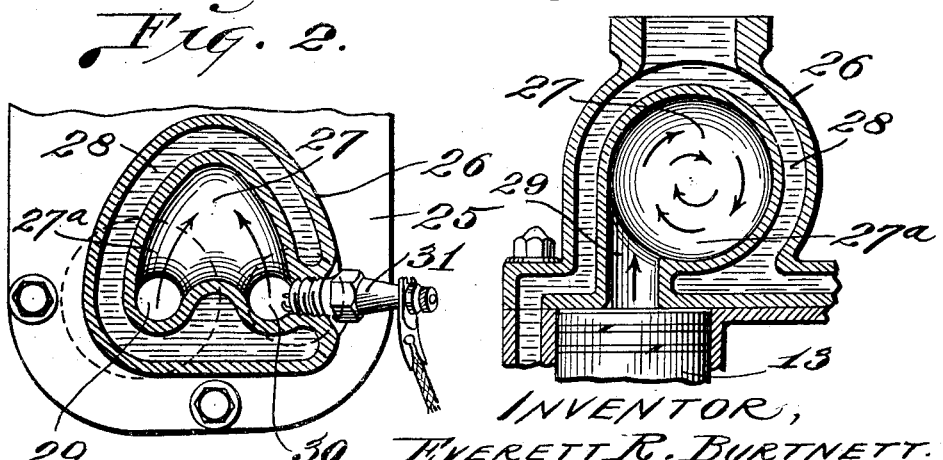
Figure 2 is a horizontal section taken approximately on the line 2—2 of Figure 1.
Figure 3 is a vertical section taken on the line 3—3 of Figure 1.

Referring by numerals to the accompanying drawings which illustrate a practical embodiment of my invention, 10 designates one of the wings of a substantially V-shaped cylinder block, and in which wing are formed combustion chambers 11 and 12. A piston 13 is arranged for operation within the combustion chamber 11, said piston being connected by means of a connecting rod 14 to a crank throw 15 of a crank shaft 16.

A piston 17 is arranged for operation within combustion chamber 12, and said piston is connected by a connecting rod 18 to the intermediate portion of a connecting rod 19 that connects the crank throw 15 with the piston in the chamber of a pumping cylinder that is formed in the wing 20 of the V-shaped cylinder block 10 opposite the wing in which combustion chambers 11 and 12 are formed. Piston 17 controls the passage of gaseous fuel from a transfer duct 21 through an inlet port 22 into the intermediate portion of combustion chamber 12 and piston 13 controls the passage of exhaust gases and products of combustion from combustion chamber 11 through exhaust ports 23 into exhaust pipe or manifold 24.

Exhaust ports 23 are located so that they are uncovered and open only when the piston 13 is at the lower or outer end of its stroke, and likewise transfer inlet ports 22 are uncovered and open only when piston 17 is at the lower or outer end of its stroke.

All of the parts just described are disclosed in my patent hereinbefore referred to and for a more complete description of the construction and operation thereof reference may be had to such patent.

The turbulence head contemplated by my invention comprises a head block 25 that is secured in any suitable manner on the head end of block 10, and formed integral with and projecting upwardly from said block directly over the chambers 11 and 12 is a substantially dome shaped member 26, within which is formed a turbulence chamber 27. The wall of this dome shaped member is preferably formed with a chamber 28 or series of connected chambers through which may be circulated a fluid cooling medium, such as water, for the purposes of heat convection. The dome shaped member 26 is formed so that the greater portion of chamber 27 lies to one side of a transversely disposed line that intersects the axes of chambers 11 and 12, and said chamber 27 gradually tapers or decreases in width from bottom toward its top, and from its inner portion or that portion which lies coincident with the plane occupied by the axes of the chambers 11 and 12 toward its outer portion.

Thus in effect the chamber 27 is substantially heart shaped, with its lower portion divided or bifurcated so as to provide a pair of spaced curved channels or depressions 27ª that gradually merge with each other at the outer and upper portion of the chamber. Formed through the lower portion of the head block and connecting one of the channel shaped portions 27ª of the turbulence chamber with the head end of combustion chamber 11 is a short duct or passageway 29 and a similar duct or passageway 30 connects the other end of the curved channels 27ª with the head end of combustion chamber 12.

Seated in the head block 25 and projecting into the duct or passageway 30 is an ignition device such as a spark plug 31, and the inner ends of the electrodes thereof terminate within said duct 30.

When pistons 13 and 17 are at the lower or outer ends of their travel inlet ports 22 and exhaust ports 23 are open, thus admitting to combustion chamber 12 from corresponding pumping cylinder a gaseous fuel charge and which latter passes upwardly through combustion chamber 12, thence through duct 30 into and through turbulence chamber 27, and thence downwardly through duct 29 into and through combustion chamber 11 and as a result the greater portion of the products of combustion left in the combustion chambers and turbulence chamber from the previously ignited gaseous fuel charge will be forced out through exhaust ports 23 to manifold 24.

As the pistons move inwardly on their compression stroke the gaseous fuel charge admitted to the combustion chambers and turbulence chamber, together with a certain amount of the residual products of combustion, will be forced upwardly through ducts 29 and 30 into the turbulence chamber 27, and owing to the peculiar shape thereof this fuel charge with the residual products of combustion will be caused to whirl rapidly within said chamber, thus effecting a very thorough and intimate mixture of the residual products of combustion with the gaseous fuel charge, and as the pistons pass high center, or the inner ends of their stroke, the compressed turbulent fuel charge will be ignited by a spark produced between the terminals of the electrodes of plug 31 and the force or pressure resulting from the rapid expansion following combustion will be directed against the heads of pistons 13 and 17 to drive the same downwardly on their power stroke.

The spark plug 31 is arranged in head 25 so that the terminals of its electrodes project into the lower portion of duct 30, and consequently the spark to ignite the compressed turbulent fuel charge is produced within the stratum of relatively rich gaseous fuel that enters the combustion chamber 12 just before inlet port 22 is closed and which relatively rich mixture lies directly over the head of piston 17 during its upward or compression stroke.

An internal combustion engine turbulence head of my improved construction is comparatively simple, may be easily and cheaply produced, and is very effective in performing its intended functions, and it will be readily understood that minor changes in the form, size and proportion of the various parts may be made for those herein shown and described without departing from the spirit of the invention, the scope of which is defined by the appended claims.

I claim as my invention:

1. The combination with an internal combustion engine having a pair of combustion cylinders located adjacent to each other, of a block closing the head ends of said cylinders, a turbulence chamber formed in said block and located to one side of the plane occupied by the axes of said combustion cylinders, and ducts leading from the lower portion of said turbulence chamber downwardly through said head and communicating with the head ends of the chambers within said combustion cylinders.

2. The combination with an internal combustion engine having a pair of combustion cylinders located adjacent to each other, one of which cylinders is provided with a gaseous fuel inlet port and the other cylinder having an exhaust port, of a block closing the head ends of said cylinders, a turbulence chamber formed in said block and lying on one side of the plane occupied by the axes of the combustion cylinders, ducts leading from the lower portion of the turbulence chamber downwardly through said block and communicating with the chambers in said combustion cylinders, and an ignition device seated in the head block and projecting into the duct that connects the turbulence chamber with the cylinder having the gaseous fuel inlet port.

3. The combination with an internal combustion engine having a pair of combustion cylinders that are located immediately adjacent to each other, of a block closing the head ends of said cylinders, a turbulence chamber formed in said block and lying to one side of the plane occupied by the axes of said cylinders, which chamber gradually decreases in width toward its top and laterally away from the side that coincides with the plane occupied by the axes of the cylinders, and ducts leading from the side of said turbulence chamber downwardly through the block and communicating with the chambers in said combustion cylinders.

4. The combination with an internal combustion engine having a pair of combustion cylinders located adjacent to each other, of a block closing the head ends of said cylinders, a turbulence chamber formed in said block to one side of the plane occupied by the axes of said cylinders, the lower portion of said turbulence chamber being formed so as to produce a pair of U-shaped channels, the lower portions of which are spaced apart, and ducts connecting the lower portions of said channels with the chambers within the combustion cylinders of the engine.

5. The combination with an internal combustion engine having a pair of combustion cylinders that are located adjacent to each other, of a block closing the head ends of said cylinders, a turbulence chamber formed in said block to one side of the plane occupied by the axes of said cylinders, which turbulence chamber has communication with the chambers in said combustion cylinders, and said turbulence chamber being formed so that it gradually decreases in width toward its top and toward one side.

In testimony whereof I affix my signature.

EVERETT R. BURTNETT.